United States Patent [19]

Okada

[11] Patent Number: 5,054,923

[45] Date of Patent: Oct. 8, 1991

[54] FIBER OPTIC GYRO USING A PULSED LIGHT SOURCE

[75] Inventor: Kenichi Okada, Tokyo, Japan

[73] Assignee: Japan Aviation Electronics Industry Limited, Tokyo, Japan

[21] Appl. No.: 520,410

[22] Filed: May 8, 1990

[30] Foreign Application Priority Data

May 15, 1989 [JP] Japan ................................ 1-121862

[51] Int. Cl.$^5$ ............................................. G01C 19/64
[52] U.S. Cl. .................................................. 356/350
[58] Field of Search ......................................... 356/350

[56] References Cited

U.S. PATENT DOCUMENTS 4,265,541 5/1981 Leclerc et al. ....................... 356/350
4,283,144 8/1981 McLandrich ....................... 356/350

Primary Examiner—Vincent P. McGraw
Attorney, Agent, or Firm—Pollock, Vande Sande & Priddy

[57] ABSTRACT

In a fiber optic gyro, the operation of a light source which generates light for input as right-handed light and left-handed light into an optical fiber coil is controlled by the ON/OFF operation of a pulse generated by a logic circuit, thereby reducing the quantity of heat generated in the light source. Preferably, a DC component eliminating circuit is provided at the preceding stage of a synchronous detector for eliminating the ON/OFF frequency component of light. More preferably, a gate circuit is provided at the output side of the synchronous detector to cut off both end portions of the synchronous detector output during the ON state of the light source, thereby removing spike noise.

7 Claims, 8 Drawing Sheets

FIBER OPTIC GYRO USING A PULSED LIGHT SOURCE

BACKGROUND OF THE INVENTION

The present invention relates to a fiber optic gyro which employs a semiconductor laser or super luminescent diode as a light source and, more particularly, to a fiber optic gyro designed for less power consumption and wider application range of temperature.

Figure 1:
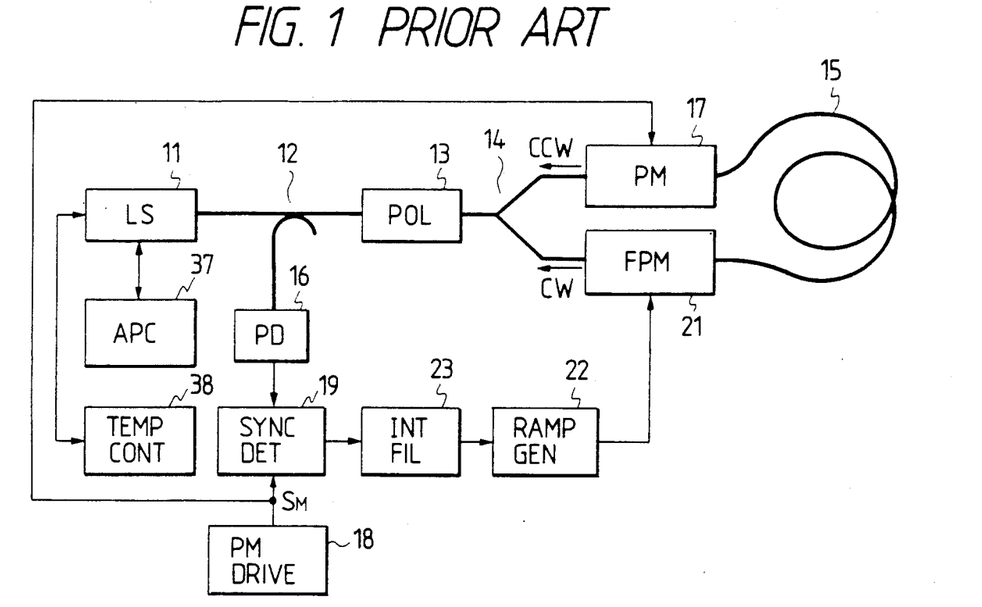
FIG. 1 is a block diagram showing a conventional fiber optic gyro.

FIG. 1 shows a conventional fiber optic gyro. Light emitted from a light source 11 is applied via an optical coupler 12 and a polarizer 13 to an optical coupler 14, from which it is input, as right-handed light and left-handed light, into an optical fiber coil 15 at both ends thereof. The right-handed and the left-handed light having propagated through the optical fiber coil 15 in opposite directions are coupled together by the optical coupler 14 and interfere with each other. The resulting interference light is provided via the polarizer 13 and the optical coupler 12 to a photodetector 16, wherein it is converted into an electrical signal.

When no angular velocity is being applied to the optical fiber coil 15 in the peripheral direction thereof, the phase difference between the right-handed and the left-handed light in the optical fiber coil 15 is substantially zero. When an angular velocity $\Omega$ is applied to the optical fiber coil 15 in its peripheral direction, a so-called Sagnac effect is produced, by which a phase difference is introduced between the right-handed and the left-handed light in the optical fiber coil 15. As is well-known in the art, the phase difference $\Delta\phi_\Omega$ is expressed by $$\Delta\phi_\Omega = \frac{4\pi RL}{C\lambda} \cdot \Omega \qquad (1)$$

where R is the radius of the optical fiber coil 15, L is the length of the optical fiber coil 15, $\lambda$ is the wavelength of light in a vacuum, C is the velocity of light, and $\Omega$ is the input angular velocity.

The intensity $I_O$ of the interference light having reached the photodetector 16 is as follows:

$$I_o = \frac{I_{max}}{2} \cdot (1 + \cos\Delta\phi_\Omega) \qquad (2)$$

where Imax is a maximum quantity of light.

Therefore, the angular velocity $\Omega$ can be detected by measuring the intensity $I_O$ of the interference light. In this instance, however, when the input angular velocity $\Omega$ is small, the phase difference $\Delta\phi_\Omega$ is small and therefore a change in $\cos \Delta\phi_\Omega$ is small, so that the input sensitivity becomes extremely low.

Figure 2:
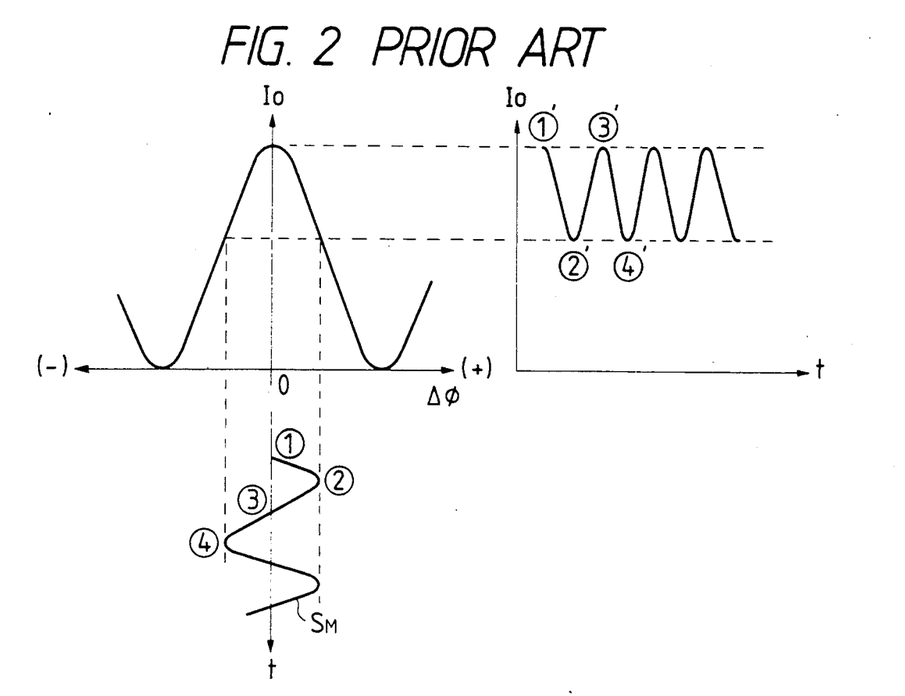
FIG. 2 is a diagram for explaining phase modulation by a sine wave and the resulting interference light.
Figure 3:
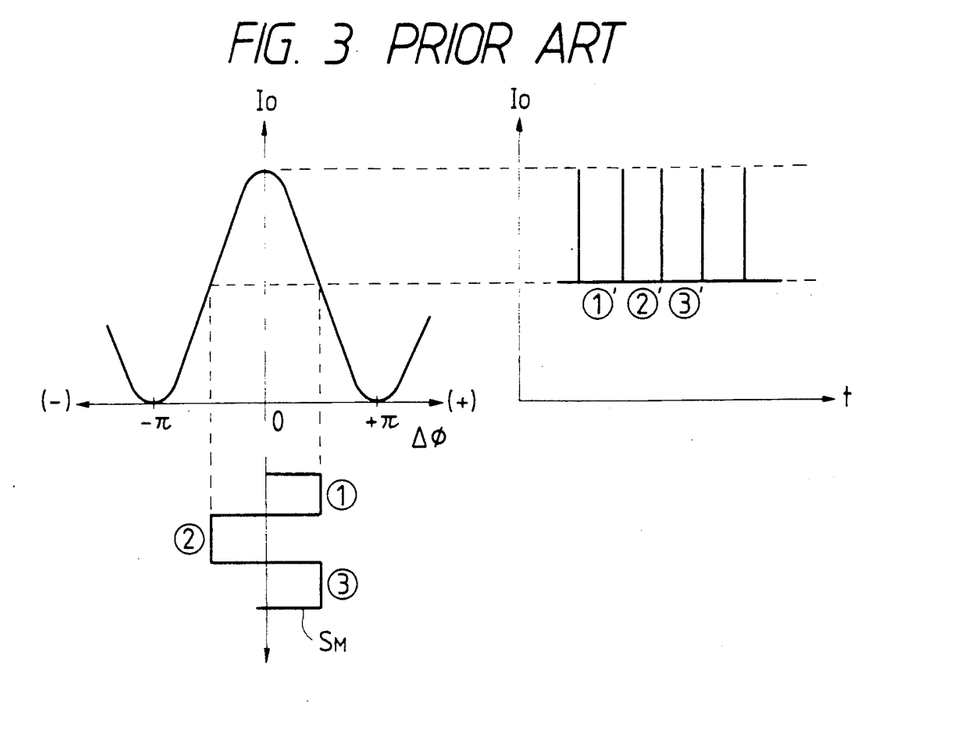
FIG. 3 is a diagram for explaining phase modulation by a rectangular wave and the resulting interference light.

To avoid this and hence optimize the input sensitivity, it is customary in the prior art to interpose between one end of the optical fiber coil 15 and the optical coupler 14 a phase modulator 17 in which the right-handed and the left-handed light are phase modulated by a drive signal available from a phase modulator drive circuit 18 as shown in FIG. 1. FIG. 2 shows the relationship between the phase modulating signal $S_M$ and the interference light when the signal $S_M$ is a sine wave, and FIG. 3 shows the abovesaid relationship when the signal $S_M$ is a rectangular wave.

In either case, the intensity $I_O$ of the interference light resulting from the phase modulation contains the following component:

$$I_s = K_s \cdot \sin \Delta\phi \cdot \cos(\omega t - \theta) \qquad (3)$$

where Ks is a constant, $\omega$ is the angular velocity of phase modulation, and $\theta$ is the phase difference between the phase modulating signal $S_M$ and the Ks·sin $\Delta\phi$ component.

Synchronously detecting the output Signal of the photodetector 16 by a synchronous detector 19 with a signal which is synchronized with the phase modulating signal $S_M$, the synchronous detector 19 yields the following output V:

$$V = K \cdot \sin \Delta\phi \qquad (4)$$

where K is a constant.

The phase $\Delta\phi$ in Eq. (4) is the phase difference between the right-handed and the left-handed light in the optical fiber coil 15, which is expressed as follows:

$$\Delta\phi = \Delta\phi_\Omega + \Delta\phi_f \qquad (5)$$

where the phase difference $\Delta\phi_f$ represents the phase difference introduced between the right-handed and the left-handed light by a feedback phase modulator 21 interposed between the other end of the optical fiber coil 15 and the optical coupler 14 as depicted in FIG. 1. The phase difference $\Delta\phi_f$ can be created by phase shifting the right-handed and the left-handed light at a fixed rate by the feedback phase modulator 21. In practice, the phase shift is effected by applying a ramp voltage from a ramp voltage generator 22 to the feedback phase modulator 21.

Figure 4:
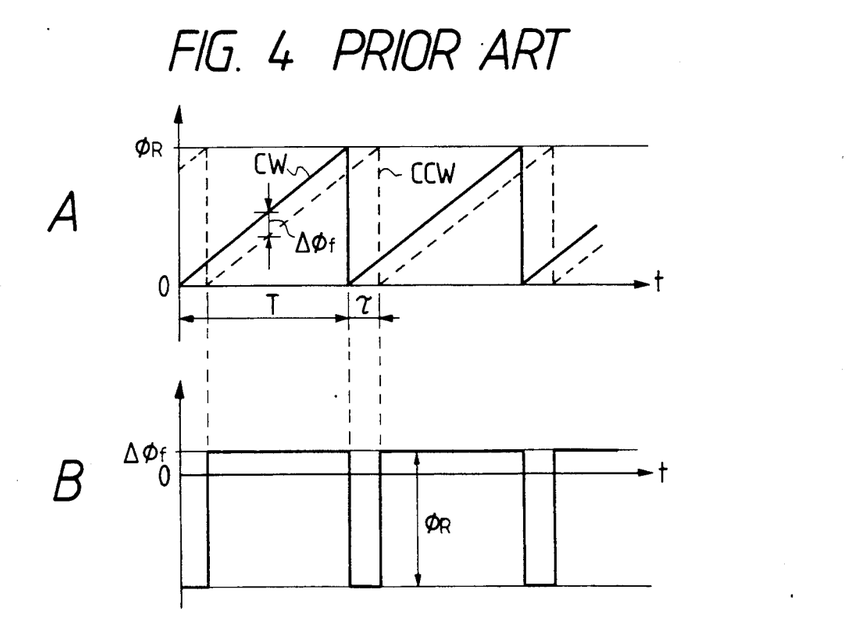
FIG. 4 is a diagram showing feedback signals of the fiber optic gyro depicted in FIG. 1.

When applying the ramp voltage to the feedback phase modulator 21, the right-handed light (hereinafter referred to as CW light) undergoes such a phase shift as indicated by the solid line at row A in FIG. 4, whereas the left-handed light (hereinafter referred to as CCW light) is delayed behind the CW light for a period of time $\tau$ for the propagation of the CCW light through the optical fiber coil 15 and is then similarly phase shifted as indicated by the broken line. As a result of this, the phase difference $\Delta\phi_f$ between the CW light and the CCW light becomes such as shown at row B in FIG. 4. In this case, if the ramp voltage is applied so that a maximum value of the phase shift $\phi_R$ of each light is $2\pi k$ (where k is an integer), the phase difference $\Delta\phi_f$ between the CW light and the CCW light is expressed as follows:

$$\Delta\phi_f = \frac{2\pi nL}{C} \cdot k \cdot f \qquad (6)$$

where f is the frequency of the ramp voltage. The output of the synchronous detector 19 is applied to an integrating filter 23, the output of which is provided to the ramp voltage generator 22, thereby generating positive and negative ramp voltages of a frequency corresponding to that of positive and negative input voltages. By controlling the frequency of the ramp voltage so that the Sagnac phase difference $\Delta\phi_\Omega$ between the CW light and the CCW light in the optical fiber coil 15 is cancelled by the phase difference $\Delta\phi_f$, a closed loop is established and the frequency f of the ramp voltage is obtained from Eqs. (1), (5) and (6) as follows:

$$f = \frac{2R}{n\lambda k} \cdot \Omega \qquad (7)$$

By measuring the frequency f of the ramp voltage based on Eq. (7), the input angular velocity Ω can be obtained with 2R/nλk as a proportional constant. Incidentally, since it is easy for those skilled in the art to measure the frequency f of the ramp voltage, no particular means therefor is shown in FIG. 1.

Figure 5A:
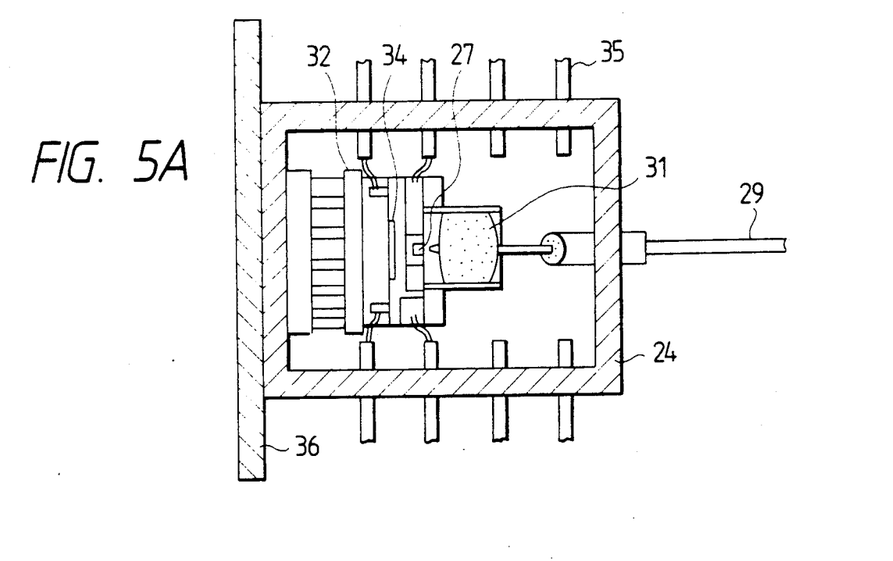
FIG. 5A is a plan view of a light source module, with its case cut off horizontally.
Figure 5B:
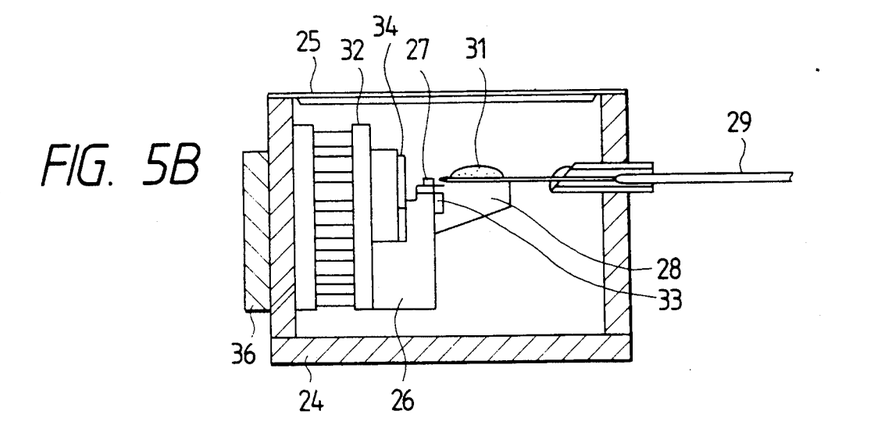
FIG. 5B is a side view of the light source module, with its case cut off vertically.

The light source 11 may have such a structure as shown in FIGS. 5A and 5B which are horizontal and vertical sectional views. In a case 24 closed by a lid 25 a heat sink 26 for a light source element 27 is disposed, on which the light source element 27 is mounted, and a spherical end optical fiber 29 having a spherical tip is fixed by solder 31 on an optical fiber support 28. The light source element 27 and the spherical end optical fiber 29 are appropriately aligned so that light from the former is incident to the latter. On the heat sink 26 there are mounted a Peltier device 32 for cooling it and a thermistor 33 for sensing its temperature. Further, a photodetector 34 for monitoring the quantity of light is provided which receives light from the light source element 27. The light source element 27, the thermistor 33 and the photodetector 34 are connected to hermetic terminals 35 mounted on the case 24, which is, in turn, mounted on a mounting plate 36.

Figure 6:
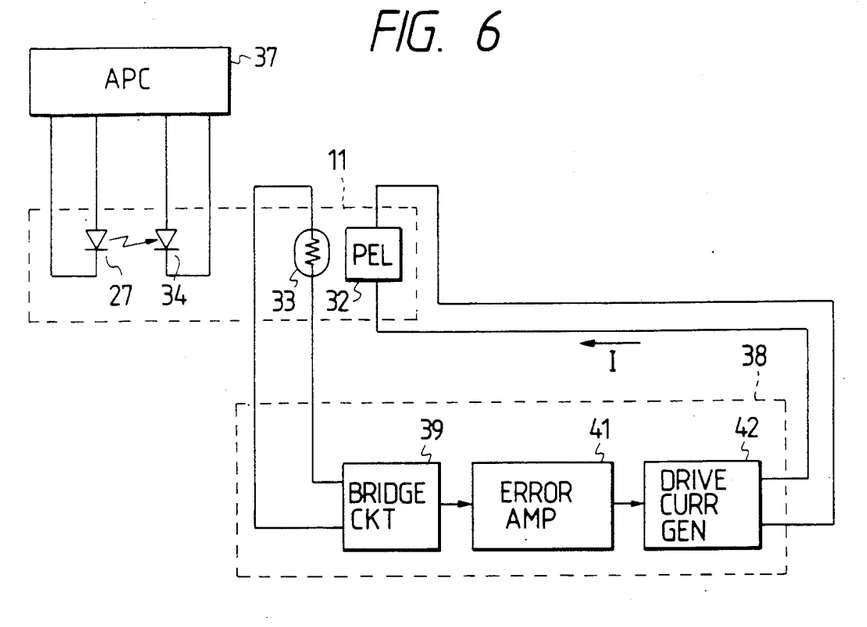
FIG. 6 is a block diagram showing temperature control and automatic light control structures of the light source module.

As depicted in FIG. 6, the output of the photodetector 34 is applied to an automatic light control circuit 37, by which the quantity of light emanating from the light source element 27 is controlled constant. The thermistor 33 is connected to a bridge circuit 39 in a temperature control circuit 38. The bridge circuit 39 yields an error signal between the temperature of the heat sink 26 detected by the thermistor 33 and a predetermined temperature. The error signal is amplified by an error signal amplifier 41 and is then provided to a Peltier device drive current generator 42, by which the drive current for the Peltier device 32 is controlled so that the temperature of the heat sink 26 becomes equal to the predetermined value.

Figure 7:
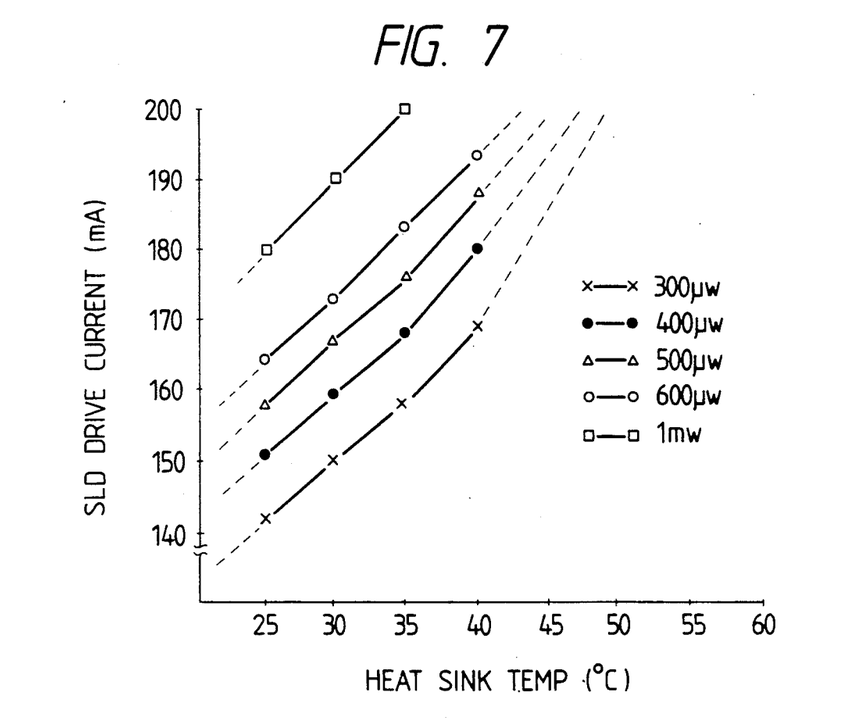
FIG. 7 is a graph showing the relationship between the heat sink temperature of an SLD and its drive current.

As the light source element 27 for use in the light source 11, a super luminescent diode (hereinafter referred to simply as SLD), which emits light of a large spectral width, is often employed for the purpose of lessening the influence of noise arising from the backward Rayleigh scattering, coupling of light between different polarization modes and the Kerr effect in the optical fiber coil 15, that is, for the purpose of providing a highly accurate fiber optic gyro. However, the drive current of the SLD greatly varies with the temperature of the heat sink 26. FIG. 7 shows the relationship of the SLD drive current to the temperature of the heat sink 26 in an SLD module.

Now, assuming that the quantity of light emitted from the spherical end optical fiber 29 of the SLD module is set to one-half of a maximum quantity of light 1 mW available from the SLD, that is, 500 μW, the temperature applicable to the SLD heat sink 26 is around 45° C. at the highest; namely, the SLD module cannot be used in, for example, a +85° C. atmosphere needed in MIL or the like.

In general, the temperature of the SLD heat sink 26 is controlled to remain constant, for instance, at 40° C. by using the Peltier device 32. The Peltier device 32 used in the light source module shown in FIGS. 5A and 5B has such characteristics as shown in FIG. 8.

Figure 8:
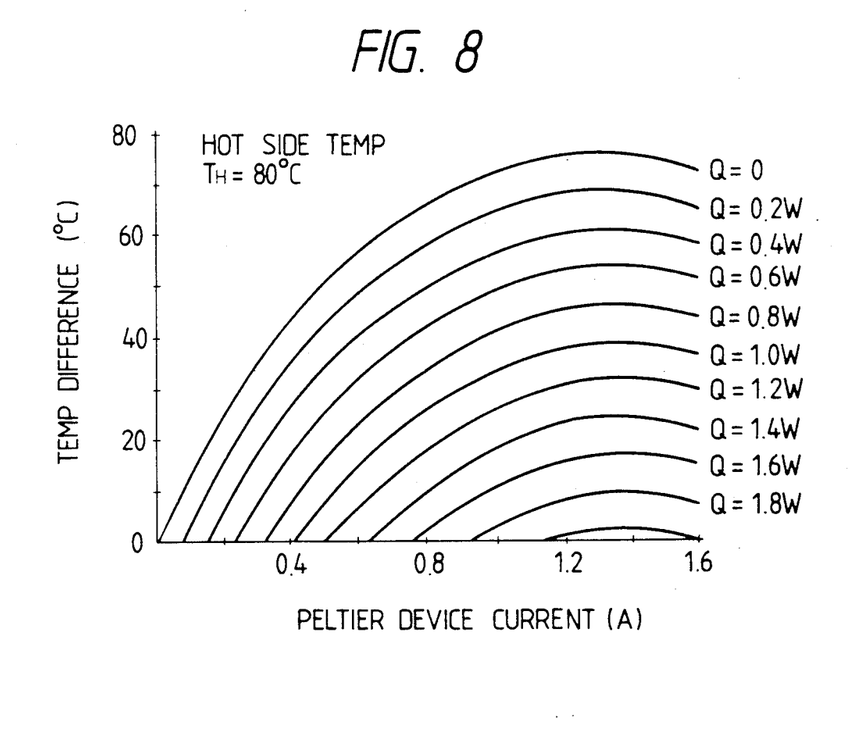
FIG. 8 is a graph showing characteristics of a Peltier device.

In FIG. 8, Q indicates the quantity of heat discharged on the cooling side of the Peltier device 32, which can be made to correspond to the quantity of heat generated by the light source element 27 mounted on the cooling surface. Strictly speaking, the amount of heat discharged on the cooling surface of the light source element 27 includes heat traveling from the spherical end optical fiber 29 and heat by radiation and convection in the light source module as well as heat generated by the light source element 27. Hence it must be taken into account that the actual performance of the Peltier device 23 is lower than its performance depicted in FIG. 8, obtained by testing the Peltier device singly. As seen from FIG. 8, when the Peltier device drive current exceeds 1 A, the heat absorption efficiency decreases. Therefore, the Peltier device drive current may preferably be 1 A or more.

Assuming that the output light of the spherical end optical fiber 29 is 500 μW as mentioned previously, the surrounding temperature at which the Peltier device drive current exceeds 1 A is about 81° C., below the required temperature +85° C., as seen from data during continuous drive of the SLD shown in FIG. 9.

On the other hand, power that is consumed for temperature control of the SLD module is expressed as the sum of power consumed by the temperature control circuit 38 and power by the Peltier device 32. Since the power required for the bridge circuit 39 and the error signal amplifier 41 is smaller than maximum power for the Peltier device drive current generator 42 and the Peltier device 32, the overall consumed power is determined essentially by the power that is consumed by the Peltier device drive current generator 42 and the Peltier device 32. Now, assuming that the power source voltage of the Peltier device drive current generator 42 is a voltage 5 V which permits the Peltier device 42 to stably effect temperature control and is considered to be relatively easily available from the system employing the fiber optic gyro and that a maximum current flowing through the Peltier device 42 is limited to 1 A, maximum power consumed by the temperature control circuit 38 is 5 W. This value, considered in combination with consumed power of other electric circuits, is equal to or greater than consumed power of a conventional gyroscope which utilizes the Coriolis effect.

As described above, the conventional fiber optic gyro employs the SLD element for higher measuring accuracy and controls the temperature of the SLD element by the Peltier device for enlarging the working temperature range. Moreover, its light source module usually employs a small Peltier device for the purposes of minimizing its power consumption for temperature control and miniaturizing the light source module.

Therefore, the conventional fiber optic gyro is inoperable at the highest temperature in its working temperature range, and in spite of using the small Peltier device, power consumption is maximum power consumed as much as 5 W for temperature control alone, which is equal to or greater than the power consumption of the gyroscope utilizing the Coriolis effect.

SUMMARY OF THE INVENTION

It is therefore an object of the present invention to provide a fiber optic gyro which has its working temperature range above 85° C. and consumes less power.

To attain the above objective, the fiber optic gyro of the present invention includes means for intermittently driving the light source. The provision of such means permits the working temperature means of the fiber optic gyro up to +85° C. or more and affords reduction of its power consumption while achieving required functions and performance of the gyro. To maintain high accuracy of the fiber optic gyro, bias eliminating means is disposed at the preceding stage of the synchronous detector to eliminate an intermittent frequency component, and in the case of further increasing accuracy, a gate circuit is provided at the succeeding stage of the synchronous detector, by which both end portions of the synchronous detector output are cut off to remove spike noises.

DESCRIPTION OF PREFERRED EMBODIMENT

Figure 10:
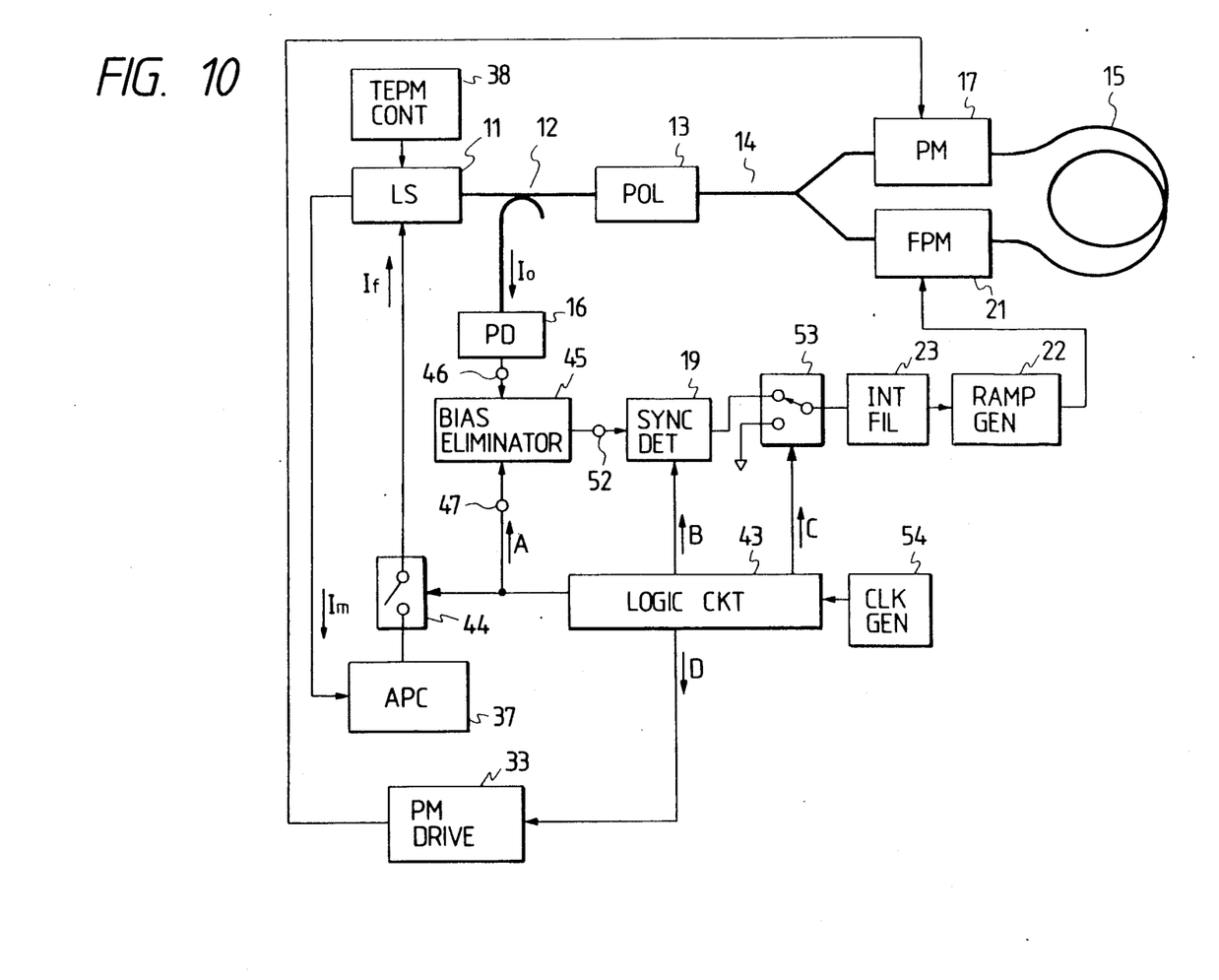
FIG. 10 is a block diagram illustrating an embodiment of the fiber optic gyro of the present invention.

FIG. 10 illustrates in block form an embodiment of the fiber optic gyro of the present invention, in which the parts corresponding to those in FIG. 1 are identified by the same reference numerals. This embodiment is common to the prior art example in the function and operation until the interference light of the CW and the CCW light having propagated through the optical fiber coil 15 is subjected to the photoelectric conversion by the photodetector 16. The light source 11 is provided in the form of such a module as shown in FIGS. 5A and 5B.

The output light of the light source 11 is controlled by an automatic light quantity control circuit 37 so that an average value of light quantity may become constant. A switch 44 is controlled by a pulse A from a logic circuit 43 to make and break, turning ON and OFF a light source drive current If. Hence, the light source 11 intermittently emits light.

Figure 11:
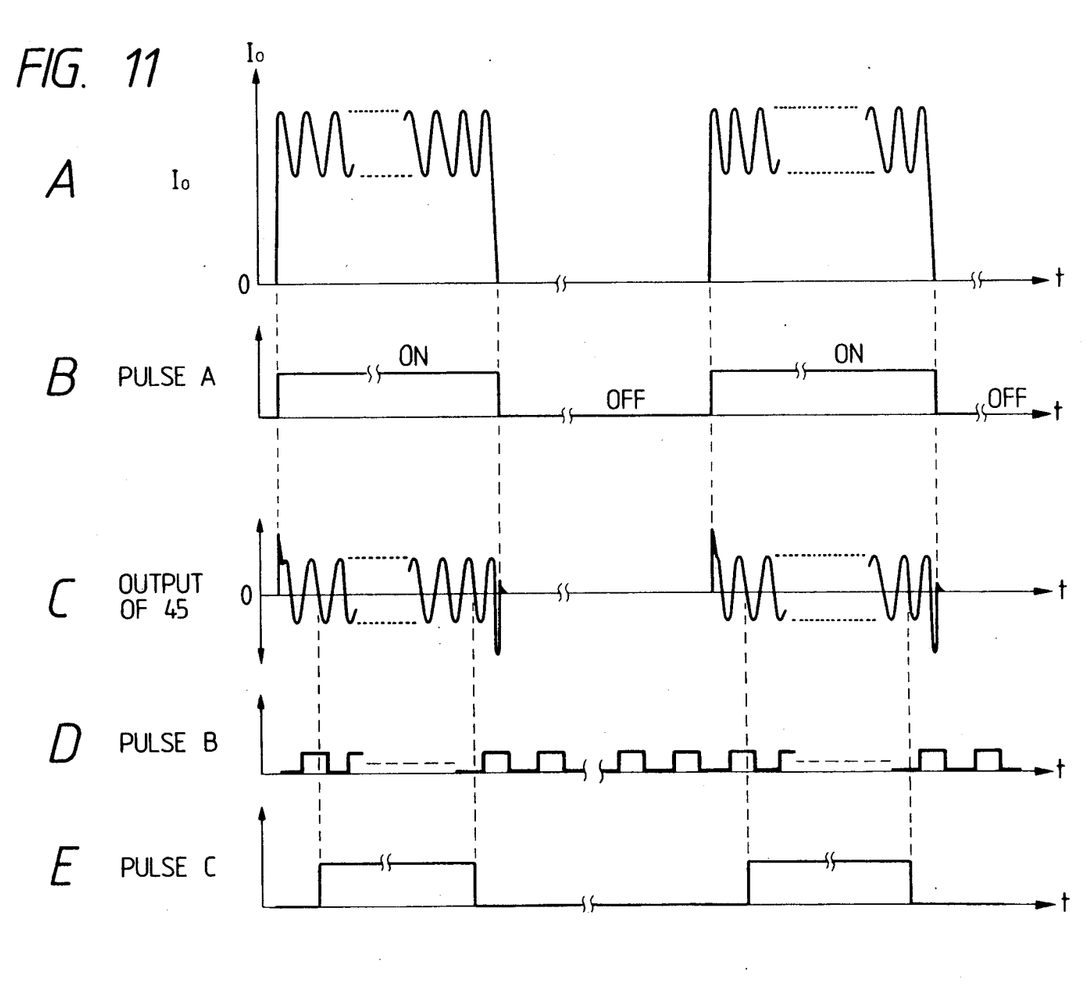
FIG. 11 is a waveform diagram showing signals at respective parts in FIG. 10.

Therefore, as shown at row A in FIG. 11, the interference light $I_0$ appears only when the pulse A (at row B in FIG. 11) is ON and hence the light source 11 is in operation, and the interference light $I_0$ is zero when the pulse A is OFF and hence the light source 11 is out of operation.

Figure 12:
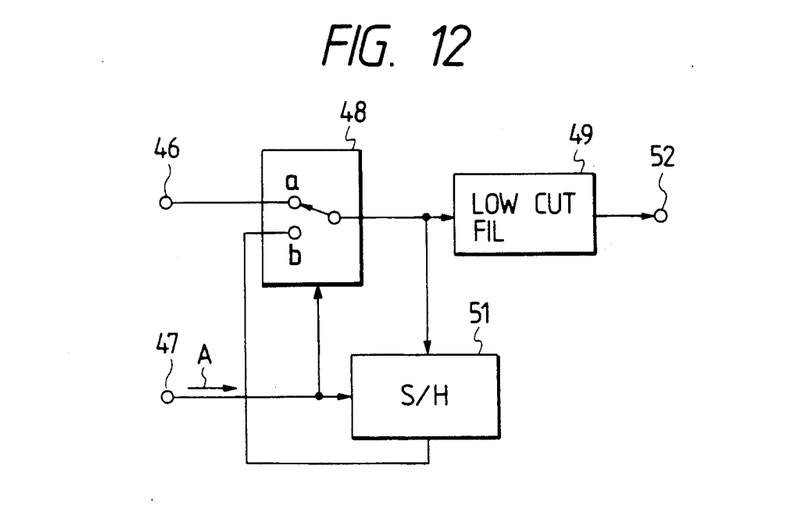
FIG. 12 is a block diagram showing a specific operative example of a bias eliminator.

The interference light $I_0$ is subjected to photoelectric conversion by the photodetector 16, the output of which is applied to an input terminal 46 of a bias eliminator 45. The bias eliminator 45 has such an arrangement as shown in FIG. 12, for example, in which a switch 48 is controlled by the pulse A supplied via a terminal 47 and the converted signal of the interference light $I_0$ applied to the terminal 46 is provided to a low frequency cutoff filter 49 and a sample hold circuit 51 when the light source element 27 operates (i.e. the switch 48 is connected to its contact a). The low frequency cutoff filter 49 eliminates the DC component (i.e. a bias component) of the input signal, providing its AC component shown in row C of FIG. 11 at an output terminal 52 of the bias eliminator 45. While this occurs, the sample hold circuit 51 performs sampling of the signal level.

When the pulse A goes low and hence the light source element 27 becomes inoperative, the switch 48 is connected to a contact b, applying therethrough the output of the sample hold circuit 51 to the low frequency cutoff filter 49. When the pulse A is low-level, the sample hold circuit 51 is in the holding state and sends an average value of the signal levels sampled during the high-level period of the pulse A.

With the provision of such a sample hold circuit 51 it is possible to reduce fluctuations of the DC level caused by the operation and nonoperation of the light source element 27. In consequence, as shown at row C in FIG. 11, a frequency component caused by the operation and nonoperation of the light source element 27 that is, the same frequency component as the pulse A, is essentially eliminated from the output of the low frequency cutoff filter 49, and at the same time, an excessive transient phenomenon (i.e. a spike noise) at the boundary between the operation and the nonoperation of the light source element 27 can be reduced.

The output of the bias eliminator 45 is provided to the synchronous detector 19, in which the same component as the phase modulating frequency is synchronously detected by a pulse B from the logic circuit 43. The detected output is taken out by a switch 53 as a gate circuit during the operation of the light source 11. The gate circuit 53 is provided for enhancement of the measurement accuracy by removing spike noise left unremoved by the bias eliminator 45 and hence remaining in the synchronous detector output. A pulse C provided from the logic circuit 43 for controlling the switch 53 has a shorter ON period than that of the pulse A. The switch 53 is controlled by the pulse C to make and break in such a manner as to cut off both end portions of the detected signal from the synchronous detector 19 in which spike noises are contained. The signal having removed therefrom such spike noise is applied to the feedback loop integrating filter 23 such as a PID (Proportional plus Integral plus Derivative) filter. The output of the integrating filter 23 is provided to the ramp voltage generator 22, thereby generating positive and negative ramp voltages of a frequency corresponding to the positive and negative input voltage. The ramp voltage from the ramp voltage generator 22 is applied to a feedback phase generator 21.

As the feedback phase modulator 21 there has been used a phase modulator which utilizes the electrooptic effect of an optical crystal of lithium niobate ($LiNbO_3$). The feedback phase modulator 21 supplied with the ramp voltage shifts the phases of CW light and the CCW light of the optical fiber coil 15. The closed loop zero method employed in the subsequent operation is the same as described previously with respect to the prior art example shown in FIG. 1. The clocks A, B and C are created by the logic circuit 43 which is supplied with a clock from a clock generator 54.

Where the accuracy of the fiber optic gyro need not be extremely high, the required performance can be achieved even if the switch 53 serving as a gate circuit is omitted. While in the above description the switch 53 is disposed at the succeeding stage of the synchronous detector 19, it may also be disposed at its preceding stage. The synchronous detector 19 can be formed to include the function of the switch 53. The bias eliminator 45 is shown to be formed by a combination of the sample hold circuit 51, the switch 53 and the low frequency cutoff filter 49, but when the accuracy of the fiber optic gyro is not required to be high, the bias eliminator 45 may be formed by the low frequency cutoff filter 49 alone. In such a case, however, the aforementioned spike noise will appear noticeably. Although the embodiment has been described in connection with the closed loop zero method, the fiber optic gyro of the present invention can be implemented basically based on Eq. (4), i.e. the invention is applicable as well to an open loop type fiber optic gyro which detects the input angular velocity by directly reading the signal shown by Eq. (4). Of course, the present invention is also applicable to fiber optic gyros of other systems utilizing the signal given by Eq. (4). Moreover, in the foregoing embodiment a sine wave signal is used as the phase modulating signal, but the signal given by Eq. (4) can be obtained, even if a rectangular modulating signal is employed as shown in FIG. 3.

Figure 9:
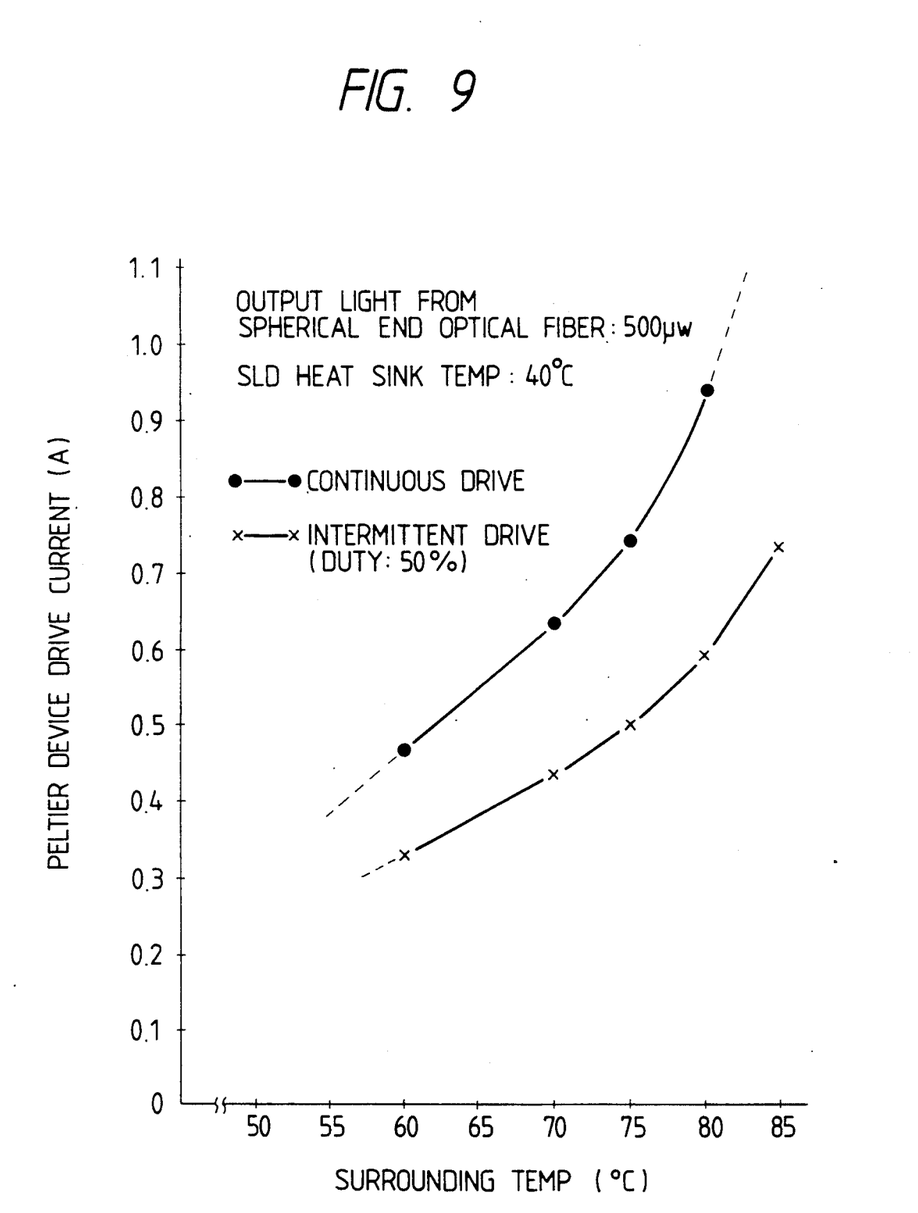
FIG. 9 is a graph showing the relationship of a Peltier device drive current to the surrounding temperature of the SLD module.

When the operation and nonoperation of the light source are repeated at regular time intervals, the characteristic of the light source module using the SLD becomes such as indicated by crosses in FIG. 9. According to the graph shown in FIG. 9, the working temperature range of the light source module sufficiently exceeds the required temperature 85° C. when the output light of the spherical end optical fiber is 500 μW and the temperature of the SLD heat sink is 40° C. The power consumption for the temperature control at a surrounding temperature of 80° C. is about 4.7 W ($\simeq$5 V×0.93 A) during the continuous drive of the light source, whereas during 50% intermittent operation the power consumption is about 2.9 W ($\simeq$5 V×0.57 A); namely, it is improved 1.6 times higher than in the prior art.

Naturally, when the power source voltage is 5 V, the power for driving the SLD (including power of the drive circuit) in the prior art is 500 μW as shown in FIG. 7 and it is about 188 mA and hence is about 1 W when the heat sink temperature is 40° C., but by the 50% intermittent operation, it can be reduced by about 0.5 W. Accordingly, the power consumption for temperature control and the SLD drive in combination can be improved around 1.7 times.

As described above, according to the present invention, the provision of the means for intermittently driving the light source enlarges the working temperature range in excess of 85° C. and enables the power consumption for temperature control of the light source to be improved approximately 1.6 times.

It will be apparent that many modifications and variations may be effected without departing from the scope of the novel concepts of the present invention.

What is claimed is:

1. A fiber optic gyro comprising:

a light source;

an optical fiber coil which makes at least one turn;

means for applying right-handed light and left-handed light from said light source to said optical fiber coil;

interference means whereby said right-handed light and left-handed light having propagated through said optical fiber coil are caused to interfere with each other;

phase modulating means connected in cascade between one end of said optical fiber coil and said interference means, for phase modulating said right-handed light and said left-handed light;

photoelectric conversion means for detecting the intensity of said interference light as an electrical signal;

synchronous detecting means for synchronously detecting a phase modulated frequency component of said electrical signal from said photoelectric conversion means;

light source drive means for repeatedly turning ON and OFF the emission of light by said light source means;

said light source drive means including logic circuit means for generating a first pulse of a fixed width with a predetermined constant period, said light source means being controlled by said first pulse to emit light of said fixed width which repeats with said constant period;

DC component eliminating means which responds to said first pulse to eliminate a DC component from the output signal of said photoelectric conversion means provided in response to the emission of light from said light source means, the resulting signal being provided to said synchronous detecting means;

said DC component eliminating means including a low frequency cutoff filter, switching means for connecting the output of said photoelectric conversion means to said low frequency cutoff filter upon each application of said first pulse, level holding means connected to the input of said low frequency cutoff filter for detecting and holding an average level of said signal provided from said photoelectric conversion means via said switching means upon each application of said first pulse, said switching means being operative to supply said low frequency cutoff filter with said average level output from said level holding means when said first pulse is not applied.

2. A fiber optic gyro comprising:

a light source;

an optical fiber coil which makes at least one turn;

means for applying right-handed light and left-handed light from said light source to said optical fiber coil;

interference means whereby said right-handed light and left-handed light having propagated through said optical fiber coil are caused to interfere with each other;

phase modulating means connected in cascade between one end of said optical fiber coil and said interference means. for phase modulating said right-handed light and said left-handed light;

photoelectric conversion means for detecting the intensity of said interference light as an electrical signal;

synchronous detecting means for synchronously detecting a phase modulated frequency component of said electrical signal from said photoelectric conversion means;

light source drive means for repeatedly turning ON and OFF the emission of light by said light source means;

said light source drive means including logic circuit means for generating a first pulse of a fixed width with a predetermined constant period. said light source means being controlled by said first pulse to emit light of said fixed width which repeats with said constant period; and gate means for cutting off a desired portion of the detected output of said synchronous detecting means;

said logic circuit means including means whereby a second pulse of a width smaller than that of said first pulse is output in synchronism with said first pulse with said constant period, and said gate means passes therethrough the detected output of said synchronous detecting means upon each application of said second pulse, thereby removing spike noise at both ends of said detected output.

3. The fiber optic gyro of claim 2, further comprising DC component eliminating means which responds to said first pulse to eliminate a DC component from the output signal of said photoelectric conversion means provided in response to the emission of light from said light source means. resulting signal being provided to said synchronous detecting means.

4. The fiber optic gyro of claim 3. wherein said DC component eliminating means includes a low frequency cutoff filter.

5. The fiber optic gyro of claim 4. wherein said DC component eliminating means includes switching means for connecting the output of said photoelectric conversion means to said low frequency cutoff filter upon each application of said first pulse.

6. The fiber optic gyro of claim 5. wherein said DC component eliminating means includes level holding means connected to the input of said low frequency cutoff filter, for detecting and holding an average level of said signal provided from said photoelectric conversion means via said switching means upon each application of said first pulse, and said switching means supplies said low frequency cutoff filter with said average level output from said level holding means when said first pulse is not applied.

7. The fiber optic gyro of claim 1 or 2, wherein said light source means includes: a heat sink; a light emitting element mounted on said heat sink, for emitting said light; a Peltier device disposed in contact with said heat sink; Peltier device drive current generating means; a temperature sensor mounted on said heat sink near said light emitting element for generating a temperature detection signal corresponding to the temperature of said heat sink; and drive current control means supplied with said temperature detection signal for controlling said drive current of said Peltier device drive current generator based on said temperature detection signal.

* * * * *